US009511350B2

(12) United States Patent
Nazarpoor et al.

(10) Patent No.: US 9,511,350 B2
(45) Date of Patent: Dec. 6, 2016

(54) ZPGM DIESEL OXIDATION CATALYSTS AND METHODS OF MAKING AND USING SAME

(71) Applicant: Clean Diesel Technologies, Inc., Oxnard, CA (US)

(72) Inventors: Zahra Nazarpoor, Camarillo, CA (US); Stephen J. Golden, Santa Barbara, CA (US)

(73) Assignee: Clean Diesel Technologies, Inc. (CDTI), Oxnard, CA (US)

( * ) Notice: Subject to any disclaimer, the term of this patent is extended or adjusted under 35 U.S.C. 154(b) by 397 days.

(21) Appl. No.: 13/891,647

(22) Filed: May 10, 2013

(65) Prior Publication Data

US 2014/0334989 A1    Nov. 13, 2014

(51) Int. Cl.
*B01D 53/94* (2006.01)
*B01J 23/00* (2006.01)
*B01J 23/656* (2006.01)

(52) U.S. Cl.
CPC ............ *B01J 23/002* (2013.01); *B01D 53/944* (2013.01); *B01J 23/6562* (2013.01); *B01D 2255/104* (2013.01); *B01D 2255/2061* (2013.01); *B01D 2255/2073* (2013.01); *B01D 2255/91* (2013.01); *B01D 2258/012* (2013.01); *B01J 2523/00* (2013.01)

(58) Field of Classification Search
None
See application file for complete search history.

(56) References Cited

U.S. PATENT DOCUMENTS

| | | |
|---|---|---|
| 3,284,370 A | 11/1966 | Alan et al. |
| 3,473,987 A | 10/1969 | Sowards |
| 3,493,325 A | 2/1970 | Roth |
| 3,896,616 A | 7/1975 | Keith et al. |
| 3,904,553 A | 9/1975 | Campbell et al. |
| 4,029,738 A | 6/1977 | Courty et al. |
| 4,062,810 A | 12/1977 | Vogt et al. |
| 4,113,921 A | 9/1978 | Goldstein et al. |

(Continued)

FOREIGN PATENT DOCUMENTS

| | | |
|---|---|---|
| CH | 644637 A5 | 8/1984 |
| CN | 102172527 | 9/2011 |

(Continued)

OTHER PUBLICATIONS

Bugarski. Exhaust Aftertreatment Technologies for Curtailment of Diesel Particulate Matter and Gaseous Emissions. Diesel Aerosols and Gases in Underground Metal and Nonmetal Mines. Power Point Presentation. 14th U.S./North American Mine Ventilation Symposium, Salt Lake City, Utah, Jun. 17, 2012. Slides 1-44. http://www.cdc.gov/niosh/mining/use.*

(Continued)

*Primary Examiner* — Walter D Griffin
*Assistant Examiner* — Jelitza Perez
(74) *Attorney, Agent, or Firm* — Alston & Bird LLP

(57) ABSTRACT

Diesel oxidation ZPGM catalyst systems are disclosed. ZPGM catalyst systems may oxidize toxic gases, such as carbon monoxide, hydrocarbons and nitrogen oxides that may be included in exhaust gases. ZPGM catalyst systems may include: a substrate, a washcoat, and an impregnation layer. The washcoat may include at least one carrier material oxides. The impregnation layer may include at least one ZPGM catalyst, carrier material oxides and OSMs. Suitable known in the art chemical techniques, deposition methods and treatment systems may be employed in order to form the disclosed ZPGM catalyst systems.

16 Claims, 8 Drawing Sheets

(56) References Cited

U.S. PATENT DOCUMENTS

| | | | |
|---|---|---|---|
| 4,188,309 A | 2/1980 | Volker et al. |
| 4,199,328 A | 4/1980 | Cole et al. |
| 4,274,981 A | 6/1981 | Suzuki et al. |
| 4,297,150 A | 10/1981 | Sims et al. |
| 4,297,328 A | 10/1981 | Ritscher et al. |
| 4,414,023 A | 11/1983 | Aggen et al. |
| 4,629,472 A | 12/1986 | Haney, III et al. |
| 4,661,329 A | 4/1987 | Suzuki et al. |
| 4,673,556 A | 6/1987 | McCabe et al. |
| 4,790,982 A | 12/1988 | Yoo et al. |
| 4,797,329 A | 1/1989 | Kilbane et al. |
| 4,885,269 A | 12/1989 | Cyron |
| 4,891,050 A | 1/1990 | Bowers et al. |
| 4,892,562 A | 1/1990 | Bowers et al. |
| 4,906,443 A | 3/1990 | Gandhi et al. |
| 5,034,020 A | 7/1991 | Epperly et al. |
| 5,063,193 A | 11/1991 | Bedford et al. |
| 5,157,007 A | 10/1992 | Domesle et al. |
| 5,162,284 A | 11/1992 | Soled et al. |
| 5,168,836 A | 12/1992 | Kraus |
| 5,175,132 A | 12/1992 | Ketcham et al. |
| 5,182,249 A | 1/1993 | Wang et al. |
| 5,203,166 A | 4/1993 | Miller |
| 5,238,898 A | 8/1993 | Han et al. |
| 5,266,083 A | 11/1993 | Peter-Hoblyn et al. |
| 5,364,517 A | 11/1994 | Dieckmann et al. |
| 5,371,056 A | 12/1994 | Leyrer et al. |
| 5,404,841 A | 4/1995 | Valentine |
| 5,501,714 A | 3/1996 | Valentine et al. |
| 5,535,708 A | 7/1996 | Valentine |
| 5,580,553 A | 12/1996 | Nakajima |
| 5,584,894 A | 12/1996 | Peter-Hoblyn et al. |
| 5,658,543 A | 8/1997 | Yoshida et al. |
| 5,693,106 A | 12/1997 | Peter-Hoblyn et al. |
| 5,708,233 A | 1/1998 | Ochi et al. |
| 5,721,188 A | 2/1998 | Sung et al. |
| 5,732,548 A | 3/1998 | Peter-Hoblyn |
| 5,743,922 A | 4/1998 | Peter-Hoblyn et al. |
| 5,747,410 A | 5/1998 | Muramatsu et al. |
| 5,749,928 A | 5/1998 | Epperly et al. |
| 5,809,774 A | 9/1998 | Peter-Hoblyn et al. |
| 5,809,775 A | 9/1998 | Tarabulski et al. |
| 5,819,529 A | 10/1998 | Peter-Hoblyn |
| 5,868,421 A | 2/1999 | Eyrainer |
| 5,879,645 A | 3/1999 | Park et al. |
| 5,898,015 A | 4/1999 | Yokoi et al. |
| 5,921,080 A | 7/1999 | Ulmet et al. |
| 5,924,280 A | 7/1999 | Tarabulski |
| 5,939,354 A | 8/1999 | Golden |
| 5,965,099 A | 10/1999 | Hartweg et al. |
| 5,968,462 A | 10/1999 | Suzuki |
| 5,968,464 A | 10/1999 | Peter-Hoblyn et al. |
| 5,976,475 A | 11/1999 | Peter-Hoblyn et al. |
| 5,977,017 A | 11/1999 | Golden |
| 6,003,303 A | 12/1999 | Peter-Hoblyn et al. |
| 6,023,928 A | 2/2000 | Peter-Hoblyn et al. |
| 6,051,040 A | 4/2000 | Peter-Hoblyn et al. |
| 6,063,350 A | 5/2000 | Tarabulski et al. |
| 6,124,130 A | 9/2000 | Olson |
| 6,129,834 A | 10/2000 | Peters et al. |
| 6,203,770 B1 | 3/2001 | Peter-Hoblyn et al. |
| 6,232,253 B1 | 5/2001 | Narula et al. |
| 6,279,603 B1 | 8/2001 | Czarnik et al. |
| 6,293,096 B1 * | 9/2001 | Khair et al. .............. 60/286 |
| 6,352,955 B1 | 3/2002 | Golden |
| 6,361,754 B1 | 3/2002 | Peter-Hoblyn et al. |
| 6,372,686 B1 | 4/2002 | Golden |
| 6,395,244 B1 | 5/2002 | Hartweg et al. |
| 6,444,178 B1 | 9/2002 | Hartweg et al. |
| 6,468,941 B1 | 10/2002 | Bortun et al. |
| 6,531,425 B2 | 3/2003 | Golden |
| 6,576,587 B2 | 6/2003 | Labarge et al. |
| 6,605,264 B2 | 8/2003 | Bortun et al. |
| 6,624,113 B2 | 9/2003 | Labarge et al. |
| 6,632,557 B1 | 10/2003 | Curelop et al. |
| 6,696,389 B1 | 2/2004 | Boegner et al. |
| 6,747,180 B2 | 6/2004 | Ostgard et al. |
| 6,774,080 B2 | 8/2004 | LaBarge et al. |
| 6,858,193 B2 | 2/2005 | Ruwisch et al. |
| 6,915,629 B2 | 7/2005 | Szymkowicz |
| 6,938,411 B2 | 9/2005 | Hoffmann et al. |
| 6,948,926 B2 | 9/2005 | Valentine et al. |
| 7,014,825 B2 | 3/2006 | Golden |
| 7,129,194 B2 | 10/2006 | Baca et al. |
| 7,374,729 B2 | 5/2008 | Chen et al. |
| 7,393,809 B2 | 7/2008 | Kim |
| 7,485,273 B2 | 2/2009 | Gandhi et al. |
| 7,563,744 B2 | 7/2009 | Klein et al. |
| 7,576,029 B2 | 8/2009 | Saito et al. |
| 7,641,875 B1 | 1/2010 | Golden |
| 7,749,472 B2 | 7/2010 | Chen et al. |
| 7,772,147 B2 | 8/2010 | Collier et al. |
| 7,785,544 B2 | 8/2010 | Alward et al. |
| 7,803,338 B2 | 9/2010 | Socha et al. |
| 7,875,250 B2 | 1/2011 | Nunan |
| 7,875,573 B2 | 1/2011 | Beutel et al. |
| 7,943,104 B2 | 5/2011 | Kozlov et al. |
| 8,080,494 B2 | 12/2011 | Yasuda et al. |
| 8,148,295 B2 | 4/2012 | Augustine |
| 8,158,551 B2 | 4/2012 | Verdier et al. |
| 8,168,125 B2 | 5/2012 | Choi |
| 8,242,045 B2 | 8/2012 | Kulkarni et al. |
| 8,802,582 B2 | 8/2014 | Malyala et al. |
| 8,845,987 B1 | 9/2014 | Nazarpoor et al. |
| 8,858,903 B2 | 10/2014 | Nazarpoor |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2002/0114746 A1 | 8/2002 | Roark et al. |
| 2002/0131914 A1 | 9/2002 | Sung |
| 2003/0092566 A1 | 5/2003 | Inoue et al. |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |
| 2003/0198582 A1 | 10/2003 | Golden |
| 2003/0221360 A1 | 12/2003 | Brown et al. |
| 2004/0018939 A1 | 1/2004 | Chigapov et al. |
| 2004/0033175 A1 | 2/2004 | Ohno et al. |
| 2004/0048125 A1 | 3/2004 | Curlop et al. |
| 2004/0087439 A1 | 5/2004 | Hwang et al. |
| 2004/0098905 A1 | 5/2004 | Valentine et al. |
| 2004/0151647 A1 | 8/2004 | Wanninger et al. |
| 2004/0166035 A1 | 8/2004 | Noda et al. |
| 2004/0172876 A1 | 9/2004 | Sprague et al. |
| 2004/0254062 A1 | 12/2004 | Crocker et al. |
| 2005/0095188 A1 | 5/2005 | Matsumoto et al. |
| 2005/0132674 A1 | 6/2005 | Toyoda et al. |
| 2005/0145827 A1 | 7/2005 | McCabe et al. |
| 2005/0160663 A1 | 7/2005 | Valentine |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0197244 A1 | 9/2005 | L'vovich et al. |
| 2005/0207956 A1 | 9/2005 | Vierheilig |
| 2005/0217751 A1 | 10/2005 | Valentine et al. |
| 2005/0227867 A1 | 10/2005 | Chen et al. |
| 2005/0265920 A1 | 12/2005 | Ercan et al. |
| 2006/0081922 A1 | 4/2006 | Golden |
| 2006/0100097 A1 | 5/2006 | Chigapov et al. |
| 2006/0120936 A1 | 6/2006 | Alive et al. |
| 2006/0166816 A1 | 7/2006 | Zhang et al. |
| 2006/0223694 A1 | 10/2006 | Gandhi et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2006/0292342 A1 | 12/2006 | Ohno et al. |
| 2007/0015656 A1 | 1/2007 | Valentine et al. |
| 2007/0209272 A1 | 9/2007 | Valentine |
| 2007/0283681 A1 | 12/2007 | Makkee et al. |
| 2008/0075646 A1 | 3/2008 | Mussmann et al. |
| 2008/0119353 A1 | 5/2008 | Jia et al. |
| 2008/0125308 A1 | 5/2008 | Fujdala et al. |
| 2008/0166282 A1 | 7/2008 | Golden et al. |

(56) References Cited

U.S. PATENT DOCUMENTS

| | | |
|---|---|---|
| 2008/0190099 A1 | 8/2008 | Yezerets et al. |
| 2008/0210184 A1 | 9/2008 | Valentine et al. |
| 2008/0226524 A1 | 9/2008 | Alive et al. |
| 2009/0004083 A1 | 1/2009 | Valentine et al. |
| 2009/0134365 A1 | 5/2009 | Sasaki et al. |
| 2009/0220697 A1 | 9/2009 | Addiego |
| 2009/0274903 A1 | 11/2009 | Addiego |
| 2009/0304566 A1 | 12/2009 | Golden et al. |
| 2009/0324468 A1* | 12/2009 | Golden et al. ............... 423/210 |
| 2009/0324470 A1 | 12/2009 | Alamdari et al. |
| 2010/0062293 A1 | 3/2010 | Triantafyllopoulos et al. |
| 2010/0111796 A1 | 5/2010 | Caudle et al. |
| 2010/0152032 A1 | 6/2010 | Galligan |
| 2010/0168449 A1 | 7/2010 | Grey et al. |
| 2010/0180581 A1 | 7/2010 | Grubert et al. |
| 2010/0184590 A1 | 7/2010 | Althofer et al. |
| 2010/0193104 A1 | 8/2010 | Ryu et al. |
| 2010/0229533 A1 | 9/2010 | Li et al. |
| 2010/0233045 A1 | 9/2010 | Kim et al. |
| 2010/0266473 A1 | 10/2010 | Chen et al. |
| 2010/0290964 A1 | 11/2010 | Southward et al. |
| 2010/0293929 A1 | 11/2010 | Zhan et al. |
| 2010/0316545 A1 | 12/2010 | Alive et al. |
| 2010/0316547 A1 | 12/2010 | Justice et al. |
| 2011/0053763 A1 | 3/2011 | Verdier et al. |
| 2011/0150742 A1 | 6/2011 | Han et al. |
| 2011/0239626 A1 | 10/2011 | Makkee et al. |
| 2012/0015801 A1 | 1/2012 | Deprez et al. |
| 2012/0039775 A1 | 2/2012 | Schirmeister et al. |
| 2012/0183447 A1 | 7/2012 | Kwan et al. |
| 2013/0012378 A1 | 1/2013 | Meyer et al. |
| 2013/0058848 A1 | 3/2013 | Nunan et al. |
| 2013/0115144 A1 | 5/2013 | Golden et al. |
| 2013/0130032 A1 | 5/2013 | Kuo et al. |
| 2013/0172177 A1 | 7/2013 | Domke et al. |
| 2013/0189173 A1 | 7/2013 | Hilgendorff |
| 2013/0236380 A1 | 9/2013 | Golden et al. |
| 2013/0323145 A1 | 12/2013 | Tran et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0274662 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor et al. |
| 2015/0005159 A1 | 1/2015 | Nazarpoor |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor |
| 2015/0182954 A1 | 7/2015 | Nazarpoor |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |
| 2016/0023188 A1 | 1/2016 | Nazarpoor |
| 2016/0030885 A1 | 2/2016 | Hatfield |
| 2016/0047751 A1 | 2/2016 | Pless et al. |
| 2016/0082422 A1 | 3/2016 | Nazarpoor |
| 2016/0121304 A1 | 5/2016 | Nazarpoor |
| 2016/0121308 A1 | 5/2016 | Nazarpoor et al. |
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |
| 2016/0136619 A1 | 5/2016 | Nazarpoor et al. |
| 2016/0136620 A1 | 5/2016 | Nazarpoor et al. |
| 2016/0136621 A1 | 5/2016 | Nazarpoor et al. |

FOREIGN PATENT DOCUMENTS

| | | |
|---|---|---|
| CN | 102371153 | 3/2012 |
| EP | 0022349 | 1/1981 |
| EP | 0450897 | 10/1991 |
| EP | 0541271 | 5/1993 |
| EP | 0605142 | 7/1994 |
| EP | 0 814 241 | 12/1997 |
| EP | 1121981 | 8/2001 |
| EP | 1 256 382 | 11/2002 |
| EP | 2441510 | 4/2012 |
| JP | 62-20613 | 1/1987 |
| JP | 4-215853 | 8/1992 |
| JP | 4144174 | 9/2008 |
| JP | 2013-27858 | 2/2013 |
| PL | 404146 | 12/2014 |
| WO | WO 90/07561 | 7/1990 |
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/085876 A1 | 11/2001 |
| WO | WO 03/068363 A1 | 8/2003 |
| WO | WO 2004/058641 A1 | 7/2004 |
| WO | WO 2008/099847 | 8/2008 |
| WO | WO 2009/139860 A1 | 11/2009 |
| WO | WO 2010/029431 | 3/2010 |
| WO | WO 2011/068509 A1 | 6/2011 |
| WO | WO 2012/093600 | 7/2012 |
| WO | WO 2012/166514 | 12/2012 |
| WO | WO 2013/004814 | 1/2013 |

(56) References Cited

FOREIGN PATENT DOCUMENTS

| WO | WO 2013/028575 | 2/2013 |
|---|---|---|
| WO | WO 2013/044115 | 3/2013 |
| WO | WO 2013/068243 | 5/2013 |
| WO | WO 2013/121112 | 8/2013 |
| WO | WO 2013/153081 | 10/2013 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |

OTHER PUBLICATIONS

Alini, S. et al., Development of new catalysts for N2O-decomposition from adipic acid plant, Applied Catalysis B: Environmental, 70, (2007) 323-329.
Azad et al. Examining the Cu-Mn-O Spinel System as an Oxygen Carrier in Chemical Looping Combustion, Energy Technology, vol. 1, Issue 1, (2013) 59-69.
Barrett, E. P. et al., The determination of pore volume and area distributions in porous substances. I. Computations from nitrogen isotherms, J. A. Chem. Soc. (1951) 73, 373-380.
Brunaubr, S. et al., Adsorption of Gases in Multimolecular Layers, J. Am. Chem. Soc. 1938, 60, 309-319.
Bugarski, Aleksandar, Exhaust Aftertreatment Technologies for Curtailment of Diesel Particulate Matter and Gaseous Emissions, Disesel Aerosols and Gases in Underground Metal and Nonmetal Mines. Power Point Presentation. 14th U.S./North American Mine Ventilation Symposium, Salt Lake City, Utah, Jun. 17th, 2012. Slides 1-44. http://www.cdc.gov/niosh/mining/use.
D. Panayotov, "Interaction Between NO, CO and O2 on gamma-AL2O3-Supported Copper-Manganese Oxides", 1996, React.Kinet.Catal.Lett. vol. 58, No. 1, 73-78.
Extended European Search Report for corresponding European Application No. 09770546.1 dated Sep. 26, 2012, 6 pages.
Extended European Search Report for corresponding European Application No. 09770547.9 dated Dec. 7, 2012, 5 pages.
Hayes et al., "Introduction to Catalytic Combustion", pp. 310-313, 1997 OPA (Overseas Publishers Association).
He, H. et al., An investigation of NO/CO reaction over perovskite-type oxide La0.8Ce0.2B0.4Mn0.6O3 (B=Cu or Ag) catalysts synthesized by reverse microemulsion, Catalysis Today, vol. 126 (2007) 290-295.
International Preliminary Report on Patentability (Chapter II) from International Application No. PCT/US2009/003800, dated May 11, 2010.
International Search Report and Written Opinion for corresponding International Application No. PCT/US2009/003799, dated Oct. 8, 2009.
International Search Report and Written Opinion for corresponding International Application No. PCT/US2009/003800 dated Oct. 22, 2009.
International Search Report and Written Opinion for corresponding International Application No. PCT/US2014/030597 dated Aug. 13, 2014.
International Search Report and Written Opinion for corresponding International Application No. PCT/US2014/033041 dated Aug. 20, 2014.
International Search Report and Written Opinion for corresponding International Application No. PCT/US2014/037452 dated Sep. 15, 2014.
International Search Report and Written Opinion for corresponding International Application No. PCT/US2014/044221, dated Oct. 3, 2014.
International Search Report and Written Opinion for corresponding International Application No. PCT/US2014/044222 dated Oct. 3, 2014.
International Search Report and Written Opinion for corresponding International Application No. PCT/US2014/046512 dated Apr. 6, 2015.
International Search Report and Written Opinion for corresponding International Application No. PCT/US2014/054874, dated Nov. 13, 2014.
International Search Report and Written Opinion for corresponding International Application No. PCT/US2014/055063 dated Nov. 24, 2014.
International Search Report and Written Opinion for corresponding International Application No. PCT/US2014/067541 dated Feb. 4, 2015.
International Search Report and Written Opinion for corresponding International Application No. PCT/US2014/067569, dated Apr. 3, 2015.
International Search Report and Written Opinion for corresponding International Application No. PCT/US2014/067589, dated Feb. 10, 2015.
International Search Report and Written Opinion for corresponding International Application No. PCT/US2015/025267 dated Jul. 2, 2015.
International Search Report and Written Opinion for corresponding International Application No. PCT/US2015/025299 dated Jul. 2, 2015.
Ishizaki, K. et al., A Study of PGM-Free Oxidation Catalyst YMnO3 for Diesel Exhaust Aftertreatment, SAE Technical Paper, (2012) http://papers.sae.org/2012-01-0365/.
K. S. Abdel Halim et al. "Catalytic Oxidation of CO Gas over Nanocrystallite CuxMn1-xFe2O4", Feb. 26, 2008, Top Catalyst (2008) 47:66-72.
Kucharczyk, B. et al., Partial substitution of lanthanum with silver in the LaMnO3 perovskite: Effect of the modification on the activity of monolithic catalysts in the reactions of methane and carbon oxide oxidation, Applied Catalysis A: General, vol. 335 (2008) 28-36.
Mestres, L. et al., Phase Diagram at Low Temperature of the System ZrO2/Nb2O5, Z.Anorg. Alig. Chem., vol. 627 (2001) 294-298.
Papavasilious et al., "Combined Steam reforming of methanol over Cu-Mn spinel oxide catalysts", Journal of Catalysis 251 (2007) 7-20.
Reddy et al., Selective Ortho-Methylation of Phenol with Methanol over Copper Manganese Mixed-Oxide Spinel Catalysts, Journal of Catalysis, vol. 243 (2006) 278-291.
Suh, J. K. et al., Characterization of transition metal-impregnated La-Al complex oxides for catalytic combustion, Microporous Materials (1995) 657-664.
Tanaka et al , "Influence of preparation method and additive for Cu-Mn spinel oxide catalyst on water gas shift reaction of reformed fuels", Applied Catalysis A: General 279 (2005) 59-66.
Wei, P. et al., In situ high-temperature X-ray and neutron diffraction of Cu-Mn oxide phases, J. Mater Sci. (2010) 45: 1056-1064.

* cited by examiner

ZPGM DIESEL OXIDATION CATALYSTS AND METHODS OF MAKING AND USING SAME

CROSS-REFERENCE TO RELATED APPLICATIONS

N/A

BACKGROUND

Technical Field

The present disclosure relates generally to catalytic converters, more particularly, to zero platinum group metals Diesel Oxidation Catalysts.

Background Information

Emission standards for unburned contaminants, such as hydrocarbons, carbon monoxide and nitrogen oxide, continue to become more stringent. In order to meet such standards, Diesel Oxidation Catalysts (DOCs), lean NOx traps (LNTs) and Continuously Regenerating Traps (CRTs) are used in the exhaust gas lines of internal combustion engines. These catalysts promote the oxidation of unburned hydrocarbons and carbon monoxide as well as the oxidation of nitrogen oxides in the exhaust gas stream to reduce engine generated pollutants. Oxidation of NO to $NO_2$ may be used for the removal of carbon soot in CRTs. One of the major limitations of current catalysts is that the Platinum Group Metals (PGM) used in their fabrication have very high demand and increasing prices.

Therefore, there is a continuing need to provide cost effective catalyst systems that provide sufficient conversion so that HC, NOx, and CO emission standards can be satisfied, minimizing the amount of PGM catalysts required.

SUMMARY

Diesel Oxidation ZPGM catalyst systems are disclosed. ZPGM catalyst systems may oxidize toxic gases, such as carbon monoxide, hydrocarbons and nitrogen oxides that may be included in exhaust gases.

In one embodiment, the disclosed ZPGM catalyst systems may be used in DOCs, upstream of Diesel Particulate Filters (DPFs), to oxidize carbon monoxide, hydrocarbons and nitrogen oxides present in the exhaust stream of diesel engines.

In one embodiment, ZPGM catalyst systems may oxidize NO to $NO_2$ which may be used in Continuously Regenerating Traps (CRTs) for the oxidation of carbon soot.

The disclosed ZPGM catalyst systems may store NO at low temperatures, and may be included in Lean NOx Trap (LNT) systems.

ZPGM catalyst converters may include: a substrate, a washcoat, an overcoat and an impregnation layer. Washcoats and overcoats may include at least carrier metal oxides and may include ZPGM catalysts. Suitable known in the art chemical techniques, deposition methods and treatment systems may be employed in order to form the disclosed ZPGM catalyst converters.

Materials suitable for use as catalysts include Yttrium, (Y), Silver (Ag), Manganese (Mn) and combinations thereof. The disclosed ZPGM DOC systems may include perovskite structures with the characteristic formulation $ABO_3$ or related structures.

Suitable materials for use as substrates may include cordierite, metallic alloys, foams, microporous materials, zeolites or combinations.

Support materials of use in catalysts including one or more of the aforementioned combinations may also include $ZrO_2$, doped $ZrO_2$ with Lanthanum group metals, $Nb_2O_5$, $Nb_2O_5$—$ZrO_2$, alumina and doped alumina, $TiO_2$ and doped $TiO_2$ or mixtures thereof.

Suitable known in the art chemical techniques, deposition methods and treatment systems may be employed to form the disclosed ZPGM catalyst systems.

According to some embodiments, ZPGM catalyst systems may include substrate and washcoat and may be formed in one step processing. In this embodiment, washcoat includes carrier metal oxides and ZPGM catalysts with perovskite structure.

According to yet another embodiment, ZPGM catalyst systems may include washcoat and impregnation layers deposited over a substrate and may be formed in two steps processing. In this embodiment, the washcoat layer may include only metal oxide supports and the impregnation layer may include ZPGM catalyst with perovskite structure.

Numerous other aspects, features and advantages of the present disclosure may be made apparent from the following detailed description, taken together with the drawing figures.

BRIEF DESCRIPTION OF THE DRAWINGS

Embodiments of the present disclosure are described by way of example with reference to the accompanying figures, which are schematic and are not intended to be drawn to scale. Unless indicated as representing prior art, the figures represent aspects of the present disclosure.

DETAILED DESCRIPTION

Figure 1:
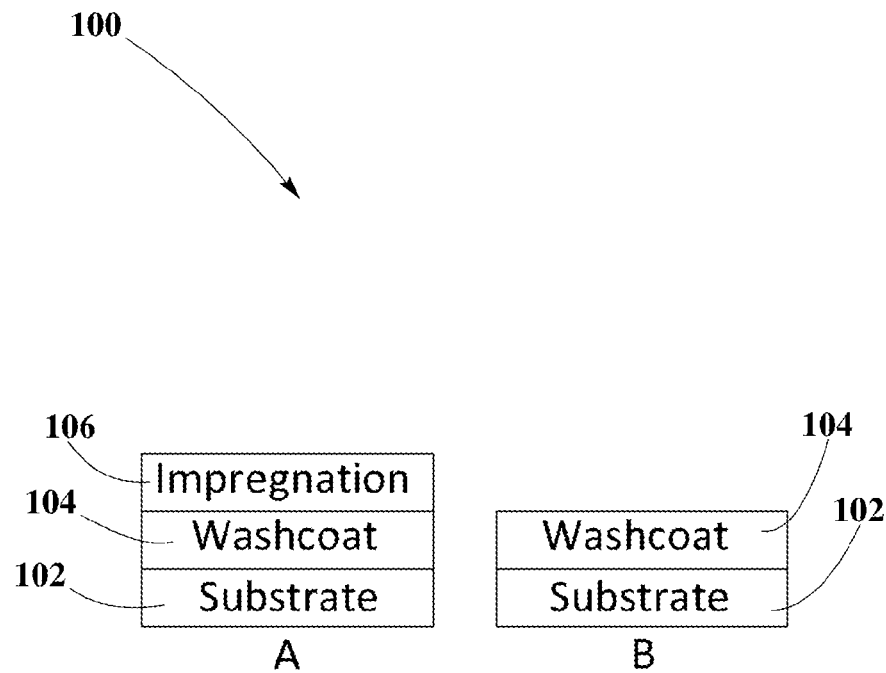
FIG. 1 shows ZPGM catalyst system structures, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

Definitions

As used here, the following terms have the following definitions:

"Exhaust" refers to the discharge of gases, vapor, and fumes including hydrocarbons, nitrogen oxide, and/or carbon monoxide.

"Impregnation" refers to the process of totally saturating a solid layer with a liquid compound.

"Wash-coat" refers to at least one coating including at least one oxide solid that may be deposited on a substrate.

"Conversion" refers to the chemical alteration of at least one material into one or more other materials.

"T50" refers to the temperature at which 50% of a material is converted.

"T90" refers to the temperature at which 90% of a material is converted.

"Oxidation Catalyst" refers to a catalyst suitable for use in oxidizing at least hydrocarbons and carbon monoxide.

"Zero Platinum Group (ZPGM) Catalyst" refers to a catalyst completely or substantially free of platinum group metals.

"Platinum Group Metals (PGMs)" refers to platinum, palladium, ruthenium, iridium, osmium, and rhodium.

Description

Various example embodiments of the present disclosure are described more fully with reference to the accompanying drawings in which some example embodiments of the present disclosure are shown. Illustrative embodiments of the present disclosure are disclosed herein. However, specific structural and functional details disclosed herein are merely representative for purposes of describing example embodiments of the present disclosure. This disclosure however, may be embodied in many alternate forms and should not be construed as limited to only the embodiments set forth herein.

System Configuration and Composition

FIG. 1 depicts ZPGM catalyst system 100 configurations, according to various embodiments. As shown in FIG. 1 A, ZPGM catalyst system 100 may include a substrate 102, a washcoat 104, and an impregnation layer 106, where washcoat 104 or impregnation layer 106, or both, may contain active oxidation ZPGM catalyst components. FIG. 1 B shows an embodiment of ZPGM catalyst system 100 that includes a substrate 102 and a washcoat 104, where washcoat 104 includes active oxidation ZPGM catalyst components.

According to an embodiment, ZPGM catalyst system 100 may include a perovskite structure having the general formula $ABO_3$ or related structures resulting from the partial substitution of the A site. Partial substitution of the A site with M element will yield the general formula $A_{1-x}M_xBO_3$. "A" may include yttrium, lanthanum, strontium, or mixtures thereof. "B" may include a single transition metal, including manganese, cobalt, chromium, or mixture thereof. M may include silver, iron, Cerium, niobium or mixtures thereof; and "x" may take values between 0 and 1. The perovskite or related structure may be present in about 1% to about 30% by weight.

ZPGM catalyst systems 100 may also include carrier material oxides in washcoat. Suitable carrier material oxides may include $ZrO_2$, doped $ZrO_2$ with Lanthanide group metals, $Nb_2O_5$, $Nb_2O_5$—$ZrO_2$, alumina and doped alumina, $TiO_2$ and doped $TiO_2$ or mixtures thereof.

Methods of Preparation of Washcoat and Impregnation Layers

Figure 2:
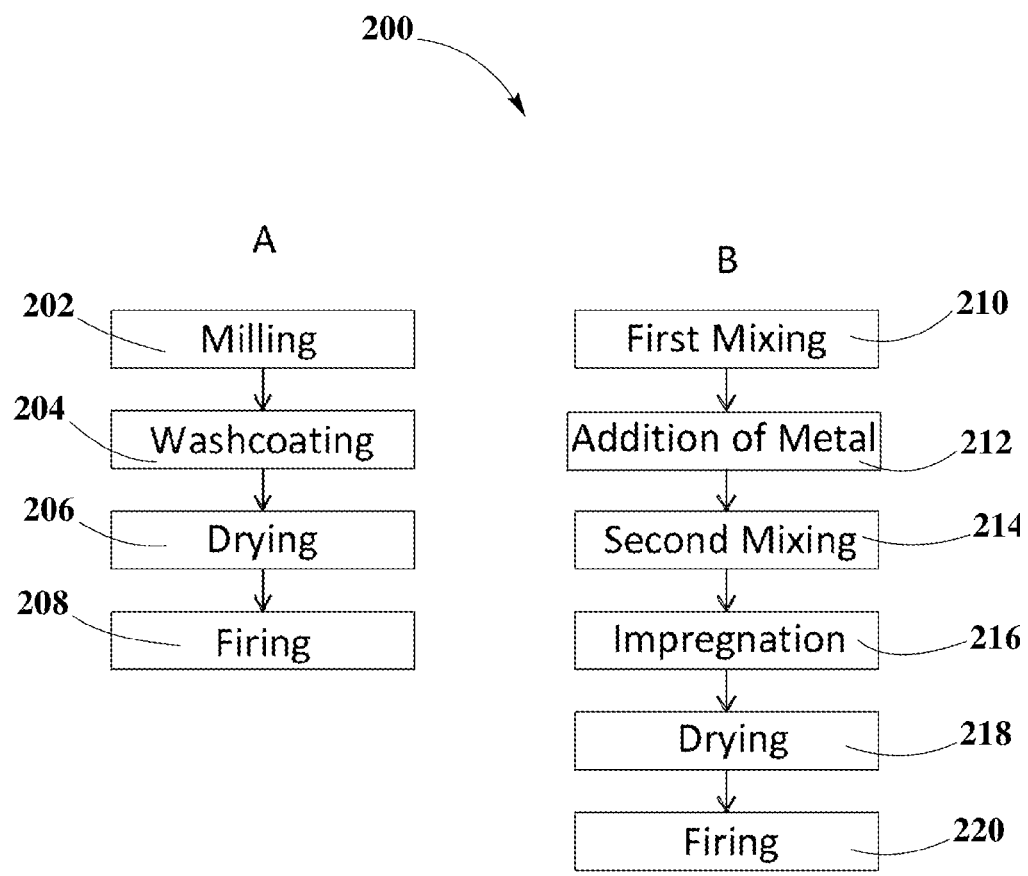
FIG. 2 is a flowchart of a method of preparation of a ZPGM catalyst, according to an embodiment.

FIG. 2 illustrates method for preparation 200 of ZPGM catalyst system 100, according to an embodiment.

In one embodiment, method for preparation 200 may be a two-step process. FIG. 2 A is a washcoat 104 preparation process. In this process, components of washcoat 104 may undergo a milling 202 process in which washcoat 104 materials may be broken down into smaller particle sizes; the mixture may include water, a suitable binder material and a carrier material oxide or OSM, or both. After milling 202 process, an aqueous slurry may be obtained. Milling 202 process may take from about 10 minutes to about 10 hours, depending on the batch size, kind of material and particle size desired. In one embodiment of the present disclosure, suitable average particle size (APSs) of the slurry may be of about 4 microns to about 10 microns, in order to get uniform distribution of washcoat 104 particles. Finer particles may have more coat ability and better adhesion to substrate 102 and enhanced cohesion between washcoat 104 and impregnation layers 106. Milling 202 process may be achieved by employing any suitable mill such as vertical or horizontal mills. In order to measure exact particle size desired during milling 202 process, laser light diffraction equipment may be employed.

After milling 202 process the aqueous slurry may be coated onto a suitable substrate 102 in washcoating 204 step. In this step, the aqueous slurry may be placed on substrate 102 in any suitable manner. For example, substrate 102 may be dipped into the slurry, or the slurry may be sprayed on substrate 102. Other methods of depositing the slurry onto substrate 102 known to those skilled in the art may be used in alternative embodiments. If substrate 102 is a monolithic carrier with parallel flow passages, a washcoat 104 may be formed on the walls of the passages. Followed by a drying 206 step, in which the washcoated substrate 102 may be dried at room temperature. Afterwards, the washcoated substrate 102 may undergo a firing 208 stage, in which the washcoated substrate 102 may be fired at a temperature ranging from 400° C. to 700° C., for approximately 2 hours to 6 hours. In an embodiment, 550° C. for 4 hours.

FIG. 2 B is a flowchart of impregnation layer 106 preparation method. The process may start with first mixing 210 step, where an yttrium nitrate solution may be added to a manganese nitrate solution and the solutions may be mixed for a suitable amount of time at room temperature. In some embodiments first mixing 210 process may last from 1 hour to 5 hours. Afterwards, during addition of metal 212 step, a silver nitrate solution or other suitable metal solutions may be added to the mixture of yttrium nitrate and manganese nitrate; then the solution may be mixed at room temperature for about 1 hour to 5 hours, during second mixing 214. When the mixture is ready, it may undergo impregnation 216 process, where the mixture may be impregnated onto a previously washcoated substrate 102. Subsequently, impregnated substrate 102 may be subjected to a drying 218 process and a firing 220 process. Firing 220 process may last between 3 hours and 6 hours, and may be performed and a temperature between 600° C. and 800. According to some embodiments, 4 hours for about 750° C.

Various amounts of washcoats 104 and impregnation layers 106 may be coupled with a substrate 102, preferably an amount that covers most of, or all of, the surface area of a substrate 102. In an embodiment, about 60 g/L to about 250 g/L of a washcoat 104 may be coupled with a substrate 102.

Other components such as acid or base solutions or various salts or organic compounds may be added to the aqueous slurry to adjust the rheology of the slurry and enhance binding of the washcoat 104 and impregnation layer 106 to the substrate 102.

EXAMPLES

In example 1, a ZPGM catalyst system 100 including a ZPGM perovskite catalyst having a cordierite substrate 102, a washcoat 104 and an impregnation layer 106 is prepared. Where washcoat 104 includes at least a carrier material oxide, such as zirconia, but free of OSM material. The washcoat 102 may include a binder or small amount rheology adjustment additives. Rheology adjustment additives may include acids, among other suitable substances. The loading may be about 80 g/L to about 180 g/L, preferably 120 g/L. The impregnation layer 106 includes at least yttrium, silver and manganese. This catalyst system is free of any oxygen storage material. The yttrium in impregnation layer 106 is present in about 1% to about 10%, by weight. The silver in impregnation layer 106 is present in about 1% to about 10%, by weight. The manganese in impregnation layer 106 is present in about 1% to about 10%, by weight. To prepare the ZPGM catalyst system 100 of example 1, carrier material oxide (zirconia) is milled. The milled slurry is deposited on the cordierite substrate 102 in the form of a washcoat 104 and then heat treated. This treatment may be performed at about 400° C. to about 700° C. In some embodiments this treatment may be performed at about 550° C. The heat treatment may last from about 2 to about 6 hours. In an embodiment the treatment may last about 4 hour. Then the impregnation 216 components may be mixed together following the process described in FIG. 2 B. After impregnation 216 the ZPGM catalyst system 100 may be dried and heat treated. This treatment may be performed at about 400° C. to about 800° C. In some embodiments this treatment may be performed at about 750° C. The heat treatment may last from about 2 to about 6 hours. In an embodiment the treatment may last about 4 hour. The resulting ZPGM catalyst system 100 has a perovskite structure $Y_{1-x}Ag_xMnO_3$.

Figure 3:
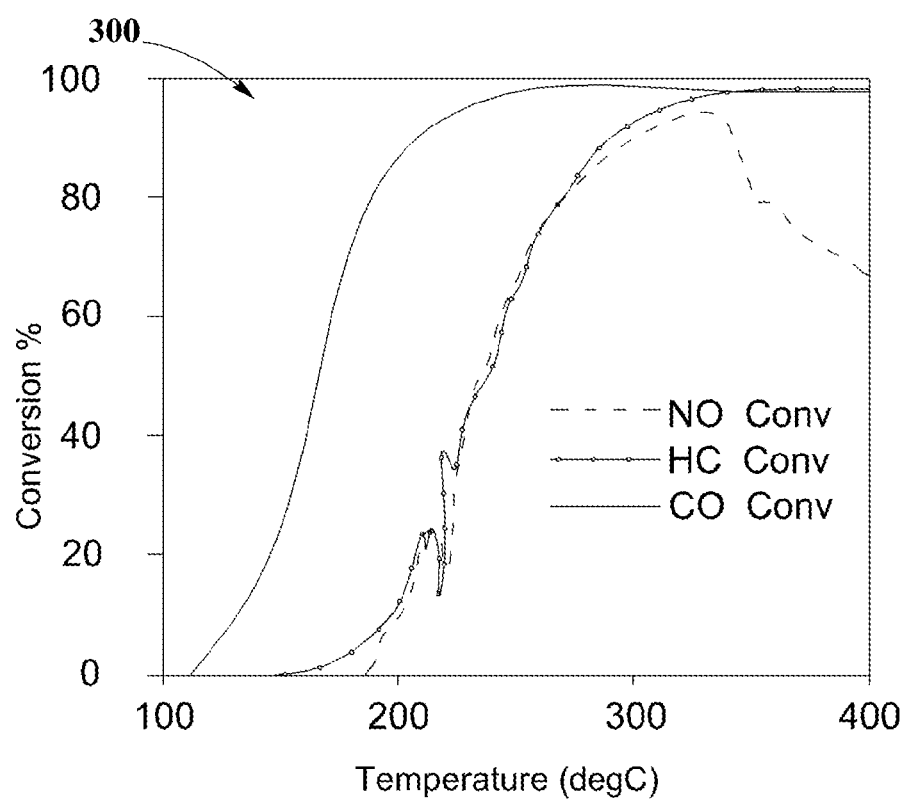
FIG. 3 shows light-off test results of a ZPGM catalyst system, according to an embodiment.

FIG. 3 shows the light-off test results 300 for the ZPGM catalyst system 100 of example 1 for fresh sample. The light-off test is performed under simulated DOC condition. Feed stream includes of 150 ppm NO, 1500 ppm of CO, 430 ppm of $C_3H_6$ as hydrocarbon, 4% $CO_2$, 4% of $H_2O$ and 14% of oxygen. The test is performed by increasing the temperature from about 100° C. to 400° C. at a constant rate of 20° C./min. The light-off test results 300 show that the ZPGM catalyst system 100 of example 1 has very high NOx conversion and hydrocarbons conversion. The T50 for CO of 166° C., a T50 for HC of 237° C. and a T50 for NO of 235° C. are obtained.

Figure 4:
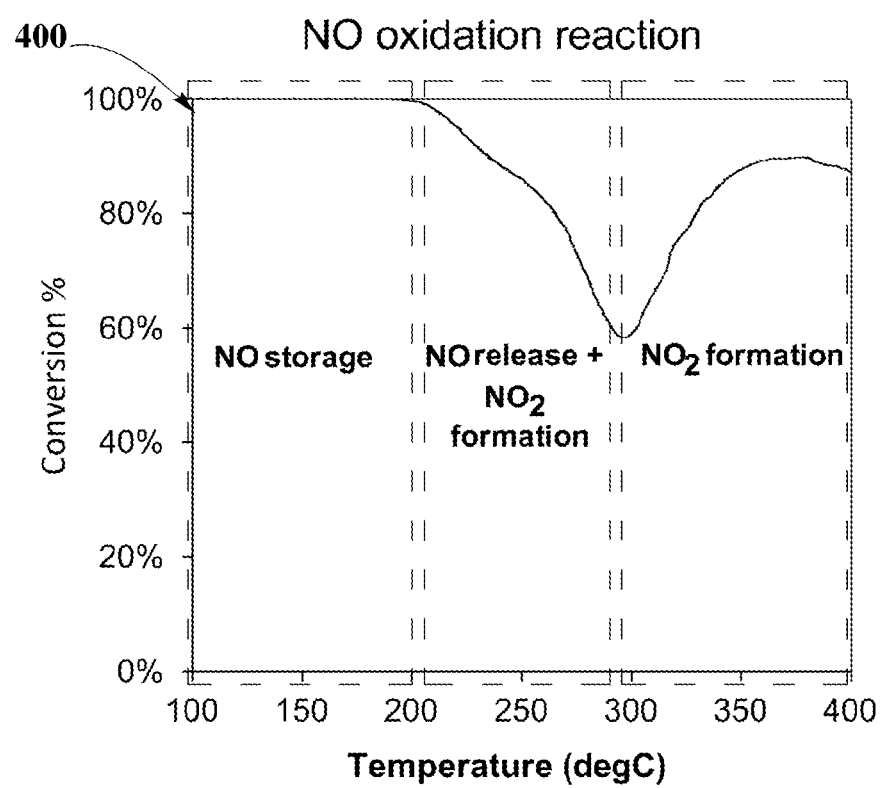
FIG. 4 shows the NO oxidation reaction of a ZPGM catalyst system, according to an embodiment.

FIG. 4 shows the NO oxidation reaction 400 of the ZPGM catalyst system 100 of example 1. The feed stream includes 150 ppm of NO and 14% of oxygen. The ZPGM catalyst system 100 of example 1 shows 100% conversion of NO at very beginning of NO oxidation reaction 400, this behavior is related to the adsorption of NO by the ZPGM catalyst system 100 of example 1 at temperatures below 200° C. The ZPGM catalyst system 100 of example 1 may function as a NOx trap, storing NO present in the exhaust stream at temperatures as low as 100° C. As shown in FIG. 4, between 200° C. and approximately 300° C., the NO conversion of the ZPGM catalyst system 100 of example 1 may decrease, this may be caused by the releasing the stored NO. However, $NO_2$ production may also start within this temperature range, characterize by a large desorption (release) of NO. At temperatures higher than about 300° C., the increasing the conversion of NO in the ZPGM catalyst system 100 of example 1 may be caused by the oxidization of the NO present in the exhaust stream and the formation of $NO_2$.

Figure 5:
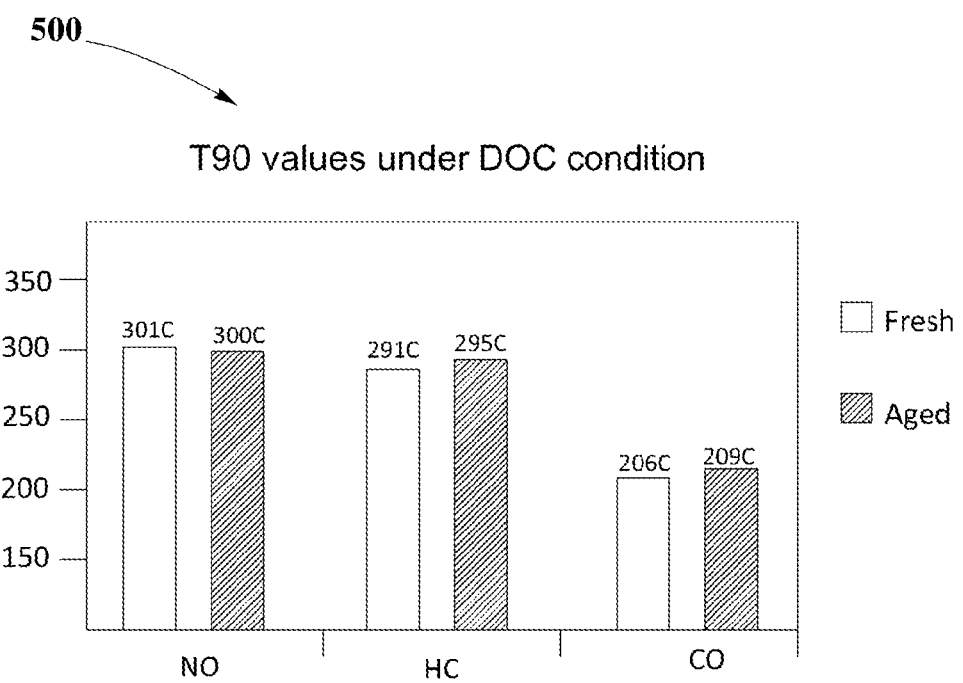
FIG. 5 shows T50s and T90s of a ZPGM catalyst system, according to an embodiment.

FIG. 5 shows bar graph 500, which compares the T90s for conversion of HC, NO and CO of fresh and aged samples of the ZPGM catalyst systems 100 of example 1, under simulated DOC condition. The gas in the feed stream includes 150 ppm of NO, 1500 ppm of CO, 430 ppm of C3H6 as hydrocarbon, 4% of $CO_2$, 4% of $H_2O$ and 14% of oxygen. The tests are performed by increasing the temperature from about 100° C. to about 400° C. at a constant rate of 20° C./min. The aged samples were hydrothermally aged at 750° C. during 5 hours with 10% steam present. As shown in bar graph 500 there is no significant difference between the behavior of fresh and aged samples, which shows that the ZPGM catalyst systems 100 of example 1 are highly stable under aging conditions.

Figure 6:
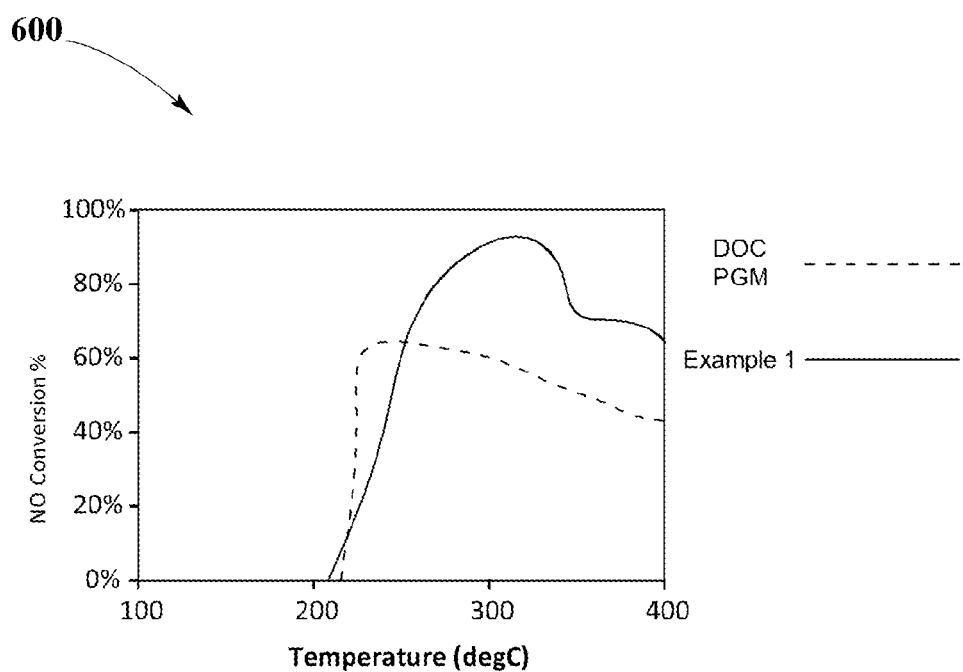
FIG. 6 shows light-off test results of a ZPGM catalyst system, according to an embodiment.

FIG. 6 shows light-off test results 600. FIG. 6 compares the NO conversion of a reference platinum group metal (PGM) catalyst and the ZPGM catalyst system 100 of example 1 under simulated DOC conditions. The gas in the feed stream includes 150 ppm of NO, 1500 ppm of CO, 430 ppm of $C_3H_6$ as hydrocarbon, 4% of $CO_2$, 4% of $H_2O$ and 14% of oxygen. The test is performed by increasing the temperature from about 100° C. to 400° C. at a constant rate of 20° C./min. Both catalysts are hydrothermally aged at 750° C. for 5 hours with 10% steam present. The PGM catalyst used as reference contains Pt (about 18 g/ft^3) and Pd (about 1 g/ft^3). As shown in FIG. 6, the ZPGM catalyst system 100 of example 1 is capable of oxidizing higher percentages of the NO present in an exhaust stream. The NO conversion is related to the oxidation of NO to $NO_2$. Reference PGM catalyst, after aging, shows a T50 for NO of 228° C., while T90 for NO is not available. ZPGM catalyst system 100 of example 1, after aging, shows a T50 for NO of 247° C. and T90 for NO of 303° C. The oxidation of NO to $NO_2$ is important in diesel emission control systems in which $NO_2$ may be used in CRTs for oxidation of carbon soot.

Figure 7:
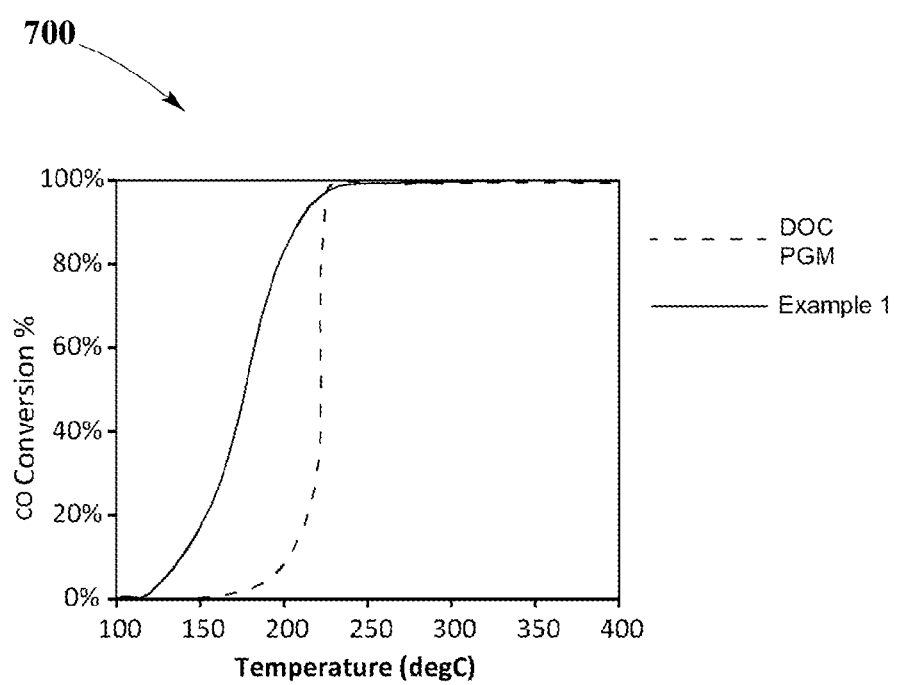
FIG. 7 shows light-off test results of a ZPGM catalyst system, according to an embodiment.

FIG. 7 shows light-off test results 700. FIG. 7 compares the CO conversion of a reference platinum group metal (PGM) catalyst and the ZPGM catalyst system 100 of example 1 under simulated DOC conditions. Gas in the feed stream includes 150 ppm of NO, 1500 ppm of CO, 430 ppm of $C_3H_6$ as hydrocarbon, 4% of $CO_2$, 4% of $H_2O$ and 14% of oxygen. The test is performed by increasing the temperature from about 100° C. to 400° C. at a constant rate of 20° C./min. Both catalysts are hydrothermally aged at 750° C. for 5 hours with 10% steam present. The PGM catalyst used as reference includes Pt (18 g/ft^3) and Pd (1 g/ft^3). As shown in FIG. 7, the ZPGM catalyst system 100 of example 1 is capable of oxidizing higher percentages of CO present in an exhaust stream at lower temperatures than the reference PGM catalyst system. Reference PGM catalyst, after aging, shows a T50 and T90 for CO of 219° C. and 223° C., respectively. ZPGM catalyst system 100 of example 1, after aging, shows a T50 and T90 for CO of 178° C. and 209° C., respectively.

Figure 8:
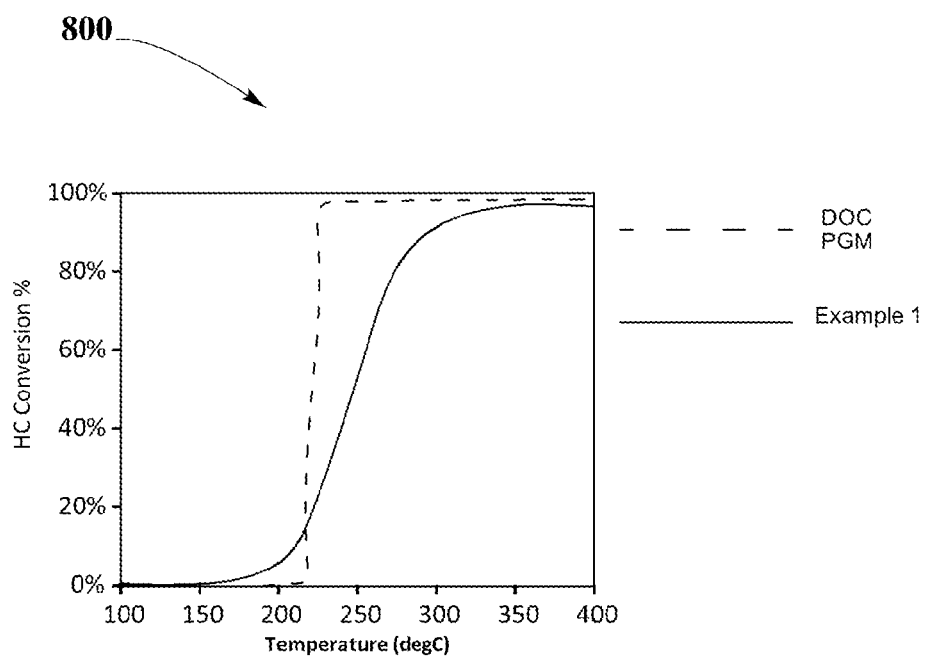
FIG. 8 shows light-off test results of a ZPGM catalyst system, according to an embodiment.

FIG. 8 shows light-off test results 800. FIG. 8 compares the HC conversion of a reference PGM catalyst and the ZPGM catalyst system 100 of example 1, under simulated DOC condition. Gas in the feed stream includes 150 ppm of NO, 1500 ppm of CO, 430 ppm of $C_3H_6$ as hydrocarbon, 4% of $CO_2$, 4% of $H_2O$ and 14% of oxygen. The test is performed by increasing the temperature from about 100° C. to about 400° C. at a constant rate of 20° C./min. Both catalysts are hydrothermally aged at 750° C. for 5 hours with 10% steam present. The PGM catalyst is used as reference includes Pt (about 18 g/ft^3) and Pd (about 1 g/ft^3). The reference PGM catalyst, after aging, shows a T50 and T90 for HC of 220° C. and 224° C., respectively. ZPGM catalyst system 100 of example 1, after aging, shows a T50 and T90 for HC of 248° C. and 295° C., respectively.

In example 2, a ZPGM catalyst system 100 including a ZPGM perovskite catalyst having a cordierite substrate 102, a washcoat 104 and an impregnation layer 106 is prepared. Where washcoat 104 includes at least carrier material oxide such as zirconia. The ZPGM catalyst system 100 of example 2 is free OSM material. The washcoat may include binder or small amount of acid for rheology adjustment. The loading is about 80 g/L to 180 g/L, preferably 120 g/L. The impregnation layer 106 includes at least yttrium and manganese. The yttrium in impregnation layer 106 is present in about 1% to about 10%, by weight and the manganese in impregnation layer 106 is present in about 1% to about 10%, by weight. To prepare the ZPGM catalyst system 100 of example 2, the carrier material oxide (zirconia) is milled. The milled slurry is deposited on the cordierite substrate 102 in the form of a washcoat 104 and then heat treated. This treatment may be performed at about 400° C. to about 700° C. In some embodiments this treatment may be performed at about 550° C. The heat treatment may last from about 2 to about 6 hours. In an embodiment the treatment may last about 4 hour. Then the impregnation components may be mixed together following the process described in FIG. 2 B. After impregnation 216 the ZPGM catalyst system 100 may be dried and heat treated. This treatment may be performed at about 400° C. to about 800° C. In some embodiments this treatment may be performed at about 750° C. The heat treatment may last from about 2 to about 6 hours. In an embodiment the treatment may last about 4 hour. The resulting ZPGM catalyst system 100 has a perovskite structure $YMnO_3$. The behavior of the ZPGM catalyst system 100 of example 2 may be similar to the behavior of the ZPGM catalyst system 100 of example 1.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

We claim:

1. A zero platinum group metal (ZPGM) catalyst system, comprising:
   a substrate; and
   a washcoat suitable for deposition on the substrate, comprising at least one carrier metal oxide, and at least one ZPGM catalyst; and
   wherein at least one of the ZPGM catalyst comprises at least one perovskite structured compound having the formula $ABO_3$, wherein each of A and B is selected from the group consisting of at least one of yttrium, silver, manganese, and combinations thereof;
   wherein yttrium is present in about 1% to about 5% by weight of the at least one ZPGM catalyst, silver is present in about 1% to about 5% by weight of the at least one ZPGM catalyst, and wherein manganese is present in about 1% to about 5% by weight of the at least one ZPGM catalyst.

2. The ZPGM catalyst system of claim 1, further comprising at least one impregnation layer, wherein the impregnation layer includes at least one ZPGM catalyst.

3. The ZPGM catalyst system of claim 2, wherein yttrium is present in about 1% to about 10% by weight of the at least one ZPGM catalyst in the at least one impregnation layer.

4. The ZPGM catalyst system of claim 2, wherein silver is present in about 1% to about 10% by weight of the at least one ZPGM catalyst in the at least one impregnation layer.

5. The ZPGM catalyst system of claim 2, wherein manganese manganese is present in about 1% to about 10% by weight of the at least one ZPGM catalyst in the at least one impregnation layer.

6. The ZPGM catalyst system of claim 1, wherein the substrate is selected from the group consisting of cordierite, metallic alloys, foams, microporous materials, zeolites, and combinations thereof.

7. The ZPGM catalyst system of claim 1, wherein the ZPGM catalyst comprises at least one perovskite structured compound having the formula $Y_{1-x}Ag_xMnO_3$ or $YMnO_3$, wherein x is from 0 to 1.

8. The ZPGM catalyst system of claim 1, wherein the at least one perovskite structured compound comprises about 1% to about 30% of the at least one of the ZPGM catalyst by weight.

9. The ZPGM catalyst system of claim 1, wherein the at least one oxide solid is selected from the group consisting of $ZrO_2$, doped $ZrO_2$ with lanthanide group metals, $Nb_2O_5$, $Nb_2O_5$—$ZrO_2$, alumina and doped alumina, $TiO_2$ and doped $TiO_2$.

10. The ZPGM catalyst system of claim 1, wherein the at least one catalyst oxidizes one selected from the group consisting of CO, hydrocarbons, nitrogen oxides, and combinations thereof.

11. An apparatus for reducing emissions from an engine having associated therewith an exhaust system, comprising:
    a substrate;
    a washcoat suitable for deposition on the substrate, comprising at least one oxide solid further comprising at least one carrier metal oxide; and
    at least one impregnation layer, wherein the impregnation layer includes at least one ZPGM catalyst;
    wherein the at least one ZPGM catalyst comprises at least one perovskite structured compound having the formula $ABO_3$, wherein each of A and B is selected from the group consisting at least one of yttrium, silver, manganese, and combinations thereof;
    wherein yttrium is present in about 1% to about 5% by weight of the at least one ZPGM catalyst, silver is present in about 1% to about 5% by weight of the at least one ZPGM catalyst, and wherein manganese is present in about 1% to about 5% by weight of the at least one ZPGM catalyst.

12. The apparatus of claim 11, wherein the washcoat and at least one impregnation layer are applied in two different application steps.

13. The apparatus of claim 12, further comprising at least one continuously regenerating trap associated with the exhaust system wherein NO or $NO_2$ is oxidized and at least partially removes carbon soot from the exhaust system.

14. The apparatus of claim 13, wherein the at least one continuously regenerating trap comprises zeolite.

15. The apparatus of claim 12, further comprising at least one lean NOx trap associated with the exhaust system.

16. A zero platinum group metal (ZPGM) catalyst system, comprising:
    a substrate;
    an overcoat suitable for deposition on the substrate, comprising at least one overcoat oxide solid selected from the group consisting at least one of a carrier metal oxide, and a ZPGM catalyst; and
    a washcoat suitable for deposition on the substrate, comprising at least one oxide solid selected from the group consisting of at least one carrier metal oxide, and at least one ZPGM catalyst; and
    wherein at least one of the ZPGM catalyst comprises at least one perovskite structured compound having the formula $ABO_3$, wherein each of A and B is selected from the group consisting at least one of yttrium, silver, manganese, and combinations thereof;

wherein at least one of the washcoat and overcoat comprises a carrier metal oxide and the at least one ZPGM catalyst, and wherein the yttrium is present in about 1% to about 5% by weight of the at least one ZPGM catalyst, silver is present in about 1% to about 5% by weight of the at least one ZPGM catalyst, and wherein manganese is present in about 1% to about 5% by weight of the at least one ZPGM catalyst.

\* \* \* \* \*

UNITED STATES PATENT AND TRADEMARK OFFICE
CERTIFICATE OF CORRECTION

PATENT NO. : 9,511,350 B2
APPLICATION NO. : 13/891647
DATED : December 6, 2016
INVENTOR(S) : Nazarpoor et al.

Page 1 of 1

It is certified that error appears in the above-identified patent and that said Letters Patent is hereby corrected as shown below:

On the Title Page

Item (73) Assignee: "Clean Diesel Technologies, Inc. (CDTI), Oxnard, CA (US)" should read --Clean Diesel Technologies, Inc., Oxnard, CA (US)--.

In the Claims

Column 7,

Lines 64-65, "wherein manganese manganese" should read --wherein manganese--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*